United States Patent [19]

Sinclair

[11] 4,242,316
[45] Dec. 30, 1980

[54] SULFAMIC ACID AS A CATALYST FOR THE POLYMERIZATION OF CHLOROCYCLOPHOSPHAZENES

[75] Inventor: David P. Sinclair, Winfield, Ill.

[73] Assignee: Standard Oil Company (Indiana), Chicago, Ill.

[21] Appl. No.: 53,351

[22] Filed: Jun. 29, 1979

[51] Int. Cl.³ .............................................. C01B 25/10
[52] U.S. Cl. .................................................... 423/300
[58] Field of Search ........................................ 423/300

[56] References Cited

U.S. PATENT DOCUMENTS

| | | | |
|---|---|---|---|
| 4,005,171 | 1/1977 | Reynard et al. | 423/300 |
| 4,123,503 | 10/1978 | Snyder et al. | 423/300 |

Primary Examiner—Wayne A. Langel
Attorney, Agent, or Firm—William C. Clarke; William H. Magidson; William T. McClain

[57] ABSTRACT

Polymerization process for the solution or bulk polymerization of chlorocyclophosphazenes using sulfamic acid compounds or derivatives of sulfamic acid as catalyst. Poly(aryloxyphosphazene) resulting therefrom can be controlled as to molecular weight, and molecular weight distribution.

12 Claims, No Drawings

SULFAMIC ACID AS A CATALYST FOR THE POLYMERIZATION OF CHLOROCYCLOPHOSPHAZENES

BACKGROUND OF THE INVENTION

Poly(organophosphazenes) constitute a substantial new class of elastomers, thermoplastics and fibers which are beginning to find use in a few applications and show potential in a variety of uses. The poly(organophosphazenes) are prepared by substitution of the halogen atoms of a polymeric intermediate, poly(dihalophosphazene), with organic moieties.

This invention relates to the preparation of poly(dihalophosphazenes) which are soluble in various inert solvents including chlorobenzenes, benzene, toluene, tetrahydrofuran and mixtures of such solvents, and the poly(aryloxyphosphazenes) resulting therefrom in solution or bulk polymerization.

More specifically, it relates to the polymerization of dichlorophosphazene of the formula $(Cl_2PN)_n$ wherein n is 3 to 7 to polymers of the formula $(Cl_2PN)_{20-50,000}$ wherein the polymerization is accomplished in the presence of a sulfamic acid compound and derivatives thereof as a catalyst. It relates to polymers and copolymers therefrom of poly(aryloxyphosphazenes).

The uncatalyzed bulk polymerization of $(Cl_2PN)_3$, $(Cl_2PN)_4$ or mixtures thereof to form soluble $(Cl_2PN)_n$ polymer is described in U.S. Pat. No. 3,370,020. The compounds are polymerized by heating them at a temperature and for a length of time ranging from about 200° C for 48 hours to 300° C. for 30 minutes.

Another known process for producing soluble poly(dichlorophosphazenes) is described by Allcock and Kugel (*J. Am. Chem. Soc.*, 87, 4216 (1965)) and elsewhere (U.S. Pat. No. 3,515,688 in Example 1) wherein cyclic trimeric $(Cl_2PN)_3$ is heated in an evacuated sealed tube for stated periods up to 48 hours at polymerization temperatures.

It has been long known that strong acids also catalyze the polymerization of $(Cl_2PN)_2$ both in bulk and in solution. Even acid washed tubes used in the polymerization have catalyzed the reaction. Also, oxidizing agents such as oxygen, sulfur and acetone as well as water have been found to catalyze the reaction. Many of these catalysts produce low molecular weight polymer and, at the same time, produce highly cross-linked polymer in bulk polymerizations.

Catalytic preparation of soluble poly(dichlorophosphazenes) is described in U.S. Pat. No. 4,005,171 wherein the catalyzed polymerization is conducted in solution or in bulk at temperatures of from about 130° C. to 220° C. for periods ranging from one hour to several days. The catalysts are selected from the group consisting of certain strong acids such as sulfonic acids, the metal or organo-metal salts of certain strong acids, certain polyhalocarboxylic acids, salts of certain miscellaneous acids and certain substituted cyclophosphazenes. Not all strong acids and their salts are active catalysts for the polymerization of cyclic $(Cl_2PN)_3$ to $(Cl_2PN)_n$ polymer. According to U.S. Pat. No. 4,005,171, HCl, HBr, $HgCl_2$ and $HgBr_2$ are not catalysts when used alone.

Catalytic conversion of low molecular weight cyclochlorophosphazenes to high molecular weight linear polydichlorophosphazenes is described in U.S. Pat. No. 4,123,503 and in German Patent Offenlegungsschrift No. 26 37 534. The thermal polymerization of $(NPCl_2)_n$ as is described in U.S. Pat. Nos. 3,370,020 and 3,515,688 and other sources already mentioned are disclosed in '503 and 26 37 534 as carried out at lower temperatures and with improved rates of conversion by using Lewis-acid compounds of aluminum and bromine. Molecular weight of the product is controlled by variation of the concentrations of the catalyst. A certain control of the molecular weight distribution of the polymerizate obtained is possible by supplementary addition of the catalyst and/or cyclic oligomers.

U.S. Pat. No. 3,937,790 discloses the use of small amounts of water as a catalyst for the polymerization of chlorocyclophosphazenes. Very low concentrations of water within the ranges of from about 0.005 mol percent to 0.10 mol percent gave $(NPCl_2)_3$ polymers with a desired intrinsic viscosity but when more than 0.2 mol percent of water was present the molecular weight of the resulting polymer was too low for elastomer applications and above 0.3 mol percent, yield of polymer decreased and crosslinked polymer was formed.

Poly(dichlorophosphazene) derived either by thermal polymerization or catalytic polymerization are precursors for poly(aryloxyphosphazenes). Polydichlorophosphazene is hydrolytically unstable. Replacement of the chloride with aryloxide substituents to yield fully substituted linear polyaryloxyphosphazenes results in a hydrolytically stable polymer with characteristically high molecular weights ($M_w \sim 10^6$) and broad molecular weight distributions ($\overline{M}_w/\overline{M}_n > 10$). $\overline{M}_w$ is defined as weight average molecular weight, $\overline{M}_n$ is defined as number average molecular weight. $\overline{M}_w/\overline{M}_n$ is defined as the ratio of the weight average molecular weight to the number average molecular weight range and is termed molecular weight distribution or polydispersity. Mathematically, $\overline{M}_n = \Sigma \overline{N}_x M_x$ wherein $\overline{N}_x$ is the mole fraction of molecules of size $M_x$. $\overline{M}_w = \Sigma W_x M_x$ wherein $W_x$ is the weight fraction of molecules of size $M_x$.

Poly(organophosphazenes) in the prior art characteristically have broad bimodal molecular weight distributions (MWD). Generally $\overline{M}_w/\overline{M}_n$ is greater than 10. It has been found that $\overline{M}_w/\overline{M}_n$ is greater than 10 especially if the intermediate, poly(dichlorophophazene) is prepared via an initiated solution polymerization.

As is discussed by R. E. Singler and G. L. Hagnauer (*Organometallic Polymers*, Academic Press, New York, 1978, p. 257-269) the macromolecular characteristics of polyphosphazenes are of a broad distribution with high molecular weight tails which Singler and Hagnauer indicate as depending on polymerization and substitution reaction conditions as well as the functionality of the polymer chain side group.

A narrow molecular weight distribution is often preferred over a broad molecular weight distribution because of the accompanying physical characteristics of the polymer. A narrow molecular weight distribution can be preferable for applications wherein greater crystallinity is required. Conversely, a broad molecular weight distribution is preferred wherein less crystallinity is required by the application. The ability to tailor molecular weight distribution (including modality) and molecular weight of poly(organophosphazenes) accordingly is of economic value.

It is considered that monomadality of the molecular weight range tends to give a better rate of crystallization of the polymer. The cause of bimodal distribution of the broad molecular weight range of poly(organophosphazenes) has been theorized (G. L. Hagnauer and B. R. La Liberte, *Jo. Ap. Poly. Sci.*, 20, 3086 (1976)) as due to heterogeneities in the bulk polymerization step, impurities in the cyclic trimer or surface catalysis effects as well as reaction conditions in the synthesis procedure of the intermediate, the poly(dichlorophosphazene). Fractionation has succeeded in narrowing the broad molecular distribution (G. L. Hagnauer and B. R. La Liberte, *Jo. Polymer Sci.* 14, 371 (1976)); however bimodal distribution has remained a problem.

The primary object of this invention is to provide a simple process for the preparation of poly(organophosphazenes) wherein control of molecular weight distribution or polydispersity is obtained.

Another object of this invention is to provide a process for preparation of poly(organophosphazenes) wherein a narrow molecular weight distribution with monomodality is obtained. Another object of this invention is to provide a catalyst which exhibits improved activity for the solution or bulk polymerization of halocyclophosphazenes.

These and other objects and advantages of the present invention will become clear from the following specification. These objects have been attained in accordance with the present invention using sulfamic acid compounds as catalysts.

For example, it has been found that sulfamic acid which is similar in strength to HCl and HBr catalyzes the polymerization of dichlorophosphazene wherein the polymerization is accomplished in solution or bulk, even though sulfamic acid is insoluble in the reaction medium, being present in the form of a suspension. The poly(dichlorophosphazenes) obtained therefrom can be precursors for poly(aryloxyphosphazenes) wherein the molecular weight range surprisingly can be controlled to within a narrow molecular weight range where $\overline{M}_w/\overline{M}_n$ is below 10 or has a broad molecular weight range wherein $\overline{M}_w/\overline{M}_n$ is above 10. Sulfamic acid has the additional advantage that the polymerizate potentially can be monomodal.

SUMMARY OF THE INVENTION

Polymerization process for solution or bulk polymerization of chlorocyclophosphazenes using sulfamic acid compounds or derivatives thereof as a catalyst. Poly(organophosphazenes) resulting therefrom can be controlled as to molecular weight and molecular weight distribution.

DETAILED DESCRIPTION OF THE INVENTION

The process of this invention is a process for the preparation of poly(dichlorophosphazenes) wherein sulfamic acid compounds or derivatives of sulfamic acid are used as catalysts. Particularly, it is a process for the polymerization of dichlorophosphazenes of the formula $(Cl_2PN)_n$ wherein n is 3 to 7 to polymers of the formula $(Cl_2PN)_{20-50,000}$ wherein the polymerization is accomplished in solution or in bulk in the presence of sulfamic acid compounds or nitrogen-substituted derivatives and certain salts thereof as a catalyst. The chlorine atoms of the resulting intermediate, poly(dichlorophosphazene) can be substituted with organic moieties to prepare poly(organophosphazenes) with improved properties. The molecular weight distribution of the poly(organophosphazenes) resulting therefrom can be controlled to where $\overline{M}_w/\overline{M}_n$ can be less than 10 or can be greater than 10. Monomodal distribution of the molecular weight range is possible with sulfamic acid as catalyst.

The success of this poly(organophosphazene) process is due primarily to the use of particular catalytic compositions which are employed therein and the operating conditions that are used.

In general, polymers of poly(organophosphazenes) have been reported to have broad molecular weight distributions wherein $\overline{M}_w/\overline{M}_n$ is greater than 10 (G. L. Hagnauer and B. R. LaLiberte, *J. Ap. Poly. Sci*, 20, 3073–3086 (1976)) (R. E. Singler and G. L. Hagnauer, *Organometallic Polymers*, Academic Press, N.Y., p. 259 (1978)). Accordingly, there has not been any systematic investigation of how to achieve a molecular weight distribution of less than 10. However, as is taught in the instant invention, a difference in distribution of molecular weight is seen depending upon the composition of the cyclic oligomers, i.e., the relative ratio of cyclic oligomers of the formula $(PNCl_2)_n$ wherein n is 3 to wherein n is 4. Cyclic oligomers having a high percentage, at least 90%, of oligomers wherein n is 3 and no more than 10% where n is 4 have been found to produce a narrow molecular weight range polymer wherein $\overline{M}_w/\overline{M}_n$ is less than 10 if sulfamic acid or derivative of sulfamic acid is the catalyst. Cyclic oligomers having a percentage of about 80 percent of oligomers where n is 3 and 20 percent where n is 4 produce a broad molecular weight range wherein $\overline{M}_w/\overline{M}_n$ is greater than 10. On the other hand, the use of almost 100% pure trimer using catalysts taught in the prior art has resulted in a broad molecular weight range wherein $\overline{M}_w/\overline{M}_n$ is typically greater than 10.

In the process of the instant invention wherein n comprises the whole numbers 3 and 4, the trimer/tetramer mole ratio is at least 90:10 and the catalyst is sulfamic acid, the resultant polymer tends toward monomodality and a polydispersity less than 6.

It has long been known that the structure of sulfamic acid in the crystalline state can be depicted as a dipolar ion, or zwitterion: $H_3N^+-SO_3^-$. The physical properties are consistent with a "salt-like" dipolar ion structure. Among these properties are high melting point and appreciable solubility only in water. It is theorized that it is the zwitterionic nature of sulfamic acid which results in its unexpected catalytic activity with respect to dichlorphosphazene cyclic oligomers, that sulfamic acid is a heterogeneous catalyst whose activity is a result of $NH_4^+$ and $-SO_3^-$ moieties on the crystal surface. The catalytic activity can be destroyed by converting the sulfamic acid to a non-zwitterionic salt such as sodium sulfamate.

Not all zwitterionic materials are active as catalysts in polymerization of poly(dichlorophosphazenes). Although glycine is a zwitterionic solid, the anionic portion is a carboxylate and a weak acid. Glycine is inactive as a catalyst in polymerization of poly(dichlorophosphazenes) under these conditions.

p-Sulfanilic acid which is functionally similar to N-phenylsulfamic acid and sulfamic acid but which does not contain a N–S bond has been found to be inactive as a catalyst in the polymerization of poly(dichlorophosphazenes).

In the present invention, sulfamic acid compounds are an essential element of the invented process, the compounds being selected from the group consisting of sulfamic acid, sulfamic acid salts and nitrogen-substituted derivatives of sulfamic acid comprising N-alkyl, N-dialkyl, N-alkyl and N-aryl, N-aryl, or N-diaryl. The alkyl moiety can be from one to 12 carbon atoms (methyl to dodecyl), the aryl moiety can be phenyl, naphthyl, anthracenyl, phenanthrenyl, benzothienyl and fluorenyl. Alkyl moieties of one to four carbon atoms including methyl, ethyl, propyl, n-butyl and isobutyl are preferred. Aryl moieties of phenyl and biphenyl are preferred. Preferred catalysts are sulfamic acid, ammonium sulfamate (which decomposes to sulfamic acid and ammonium upon melting), and N-phenyl sulfamic acid.

The sulfamic acid catalyst is employed in a concentration of from about 0.1 to 50 mmoles to one mole per liter of the ($Cl_2PN$) moiety. A preferred concentration of sulfamic acid as catalyst is from about 2 to about 20 mmoles per mole per liter of ($Cl_2PN$) moiety. Polymerization reaction temperature can be within the range of from about 100° C. to about 350° C. at pressures from 1 to 2 mm Hg to ten atmospheres. The lower polymerization reaction temperature is limited by the melting point of the polymer of approximately 110° C; the higher polymerization temperature is limited by the ceiling temperature for polymer formation of approximately 300° C. at one atmosphere. Reaction conditions must be anhydrous to prevent the presence of water and initiation of a catalytic reaction. Preferred temperature range is from about 125° C. to 275° C. at pressures of about one atmosphere. Solvents are required to be inert and have a boiling point high enough to carry out the reaction. Chlorinated hydrocarbons such as dichlorobenzene and trichlorobenzene are suitable.

Reagent grade materials were used in all preparations. Phosphorus pentachloride and dichlorophosphazene cyclic oligomers obtained from a commercial source were used as received. Ammonium chloride was dried in vacuo at 50° C. before use. o-Dichlorobenzene was recycled by first filtering the solvent through silica gel and then distilling at 180° C. Preparations were carried out in appropriate-sized standard taper glassware unless otherwise noted. Atmospheric moisture was excluded by means of a calcium chloride drying tube or by maintaining a blanket of dry nitrogen. Reactions were stirred either by magnetic stirrer or a motor-driven paddle.

In summary, the process of this invention is a process for polymerization of chlorophosphazenes to produce a ($Cl_2PN$)$_m$ polymer product having a controlled molecular weight and molecular weight range with controlled polydispersity in which m is 20 to 50,000 which process comprises polymerizing dichlorophosphazenes of the formula ($Cl_2PN$)$_n$ in which n is 3 to 7 and wherein the ($Cl_2PN$) moiety is present in a concentration of at least one mole per liter in the presence of between about 0.1 mmole to about 50 mmoles of a sulfamic acid compound per mole of ($Cl_2PN$) moiety.

Embodiments of the invention can be found in the following examples. These embodiments and examples are presented for purposes of illustration only and are not intended to limit the scope of the invention.

EXAMPLE I

Synthesis of dichlorophosphazene cyclic oligomers from phosphorus pentachloride and ammonium chloride was according to the following procedure: Phosphorus pentachloride (208 g, 1.0 mole) was suspended in o-dichlorobenzene (1.5 liter). The suspension was heated to 150° C. Ammonium chloride (56 g, 1.08 moles) was added to the reaction mixture at 150° C. The reaction temperature was maintained at 150° C. for one hour. The temperature was then raised to reflux (175°-180° C.). The reflux was maintained for 2.5 hours. The reaction mixture foamed vigorously for the first three hours of the reaction, but the foaming subsided during the last one half hour.

The reaction mixture was cooled to room temperature. Any unreacted $NH_4Cl$ was removed by filtration. The reaction solvent was removed in vacuo. An oily residue remained which was triturated with heptane to remove the cyclic oligomers. The cyclic oligomers were isolated as a crystalline solid by crystallization from warm (70° C.) heptane. Yield of ($PNCl_2$)$_n$ was 70 g (60%).

The progress of the reaction was monitored periodically by thin layer chromatography (TLC) and gas chromatograph (GC) assay. TLC was conducted on Analtech prescored silica gel plates. Cyclohexane was used as the developing solvent. The phosphazene components were visualized by spraying the developed plates with a 2:1 (v/v) mixture of aniline and pyridine. The cyclic oligomers appeared as bright red spots on the plate:trimer ($R_f$=0.29) and tetramer ($R_f$=0.22).

Assay of the reaction products by gas chromatograph (GC) or thin layer chromatography (TLC) showed the reaction products to be ($PNCl_2$)$_3$ and ($PNCl_2$)$_4$ in the mole ratio of 80:20. No further purification of this material was necessary for use in sulfamic acid initiated polymerization as exemplified in Example V. For use in other polymerization methods, the material would require further purification, preferably by vacuum distillation or sublimation as exemplified in Example III.

EXAMPLE II

Dichlorophosphazene cyclic oligomers were also synthesized from phosphorus pentachloride and benzylamine via 2,4-dibenzyldiazophosphetidine.

Benzylamine (60 ml, 0.55 mole) dissolved in 60 ml carbon tetrachloride was added dropwise to phosphorus pentachloride (114 g, 0.55 mole) suspended in 400 ml carbon tetrachloride. When the addition was completed, the reaction mixture was heated to reflux. The mixture was maintained at reflux until HCl evolution ceased, about four hours. A change in the color of the reaction mixture from pale green to colorless coincided with the cesation of HCl evolution. The diazadiphosphetidine was isolated in 45% yield (57.1 g, 0.12 mole) upon cooling. Concentration of the mother liquor in vacuo led to the recovery of an additional 24.6 g (0.05 mole, 61% overall yield); m.p. 155° C. dec. TLC (cyclohexane) $R_f$=0.15 gave a positive (red) pyridine/aniline spot.

2,4-Dibenzyldiazadiphosphetidine (5 g, 0.01 mole) was heated under reduced pressure to 150° C. by means of an oil bath. The solid initially melted at 145° C., but it resolidified after three hours at 150° C. Heating was stopped and the reaction mixture cooled and extracted with hexane. Only a small portion of the material was soluble in the hexane. TLC indicated the material to be a mixture of the diazadiphosphetidine and dichlorophosphazene cyclic oligomers principally trimer. The hexane insoluble material readily dissolved in THF indicating it was a linear material of low molecular weight. When spotted on filter paper and sprayed with pyridine/aniline, the spot gave a positive (red) test.

EXAMPLE III

The dichlorophosphazene cyclic oligomers obtained as product in EXAMPLE I were purified by vacuum distillation in the following procedure:

A mixture of dichlorophosphazene cyclic oligomers (50 g) was vacuum distilled at 120°–130° C. at 10 mm Hg. Hexachlorocyclotriphosphazene (29.8 g) was obtained as a white crystalline solid; m.p. 115° C. A black rubber was left behind in the distillation pot, presumably cross-linked poly(dichlorophosphazene).

EXAMPLE IV

Cyclic trimer, hexachlorocyclotriphosphazene from Example III, was mass thermal polymerized according to the following procedure:

Hexachlorocyclotriphosphazene (22 g, 0.19 moles) was placed in a tube (14 mm diameter). The tube was evacuated to 0.10 mm Hg and sealed. The sealed tube was placed in an oil bath and heated rapidly to 250° C. The temperature was maintained at 250°±2° C. for 48 hours at which time the tube was removed from the bath and cooled. The tube was broken open in a glove bag under dry nitrogen and dissolved in toluene. Heptane was then added to precipitate the polymer. Poly(-dichlorophosphazene) (9.4 g, 43% conversion) was isolated as an off-white gum. Unconverted hexachlorocyclotriphosphazene (7.9 g, 36%) crystallized from the heptane after stripping the heptane-toluene mixture in vacuo.

EXAMPLE V

Sulfamic acid was used as a catalyst according to the following procedure:

Mixed dichlorophosphazene cyclic oligomers (48 g, 0.41 mole), prepared as in Example I as a relatively impure product, and sulfamic acid (101.6 mg, 1.05 mmole) were suspended in 40 ml (58 g) 1,2,4-trichlorobenzene (10.4 molar solution) and heated to reflux under a dry nitrogen atmosphere. The phosphazene oligomers dissolved soon after heat was applied. Reflux was maintained for 2.83 hours. The reaction mixture was then cooled and poured into 300 ml of heptane to remove residual cyclic oligomers. The polymeric material separated from the heptane as a brown gum.

The heptane and 1,2,4-trichlorobenzene were removed in vacuo and the residual cyclic oligomers were then isolated by crystallization from heptane (12.3 g, 26%). This implied a 74% conversion. There was 3.2 g (7%) of toluene insoluble material remaining in the reaction flask. The remaining material (30.2 g, 63%) was linear polymer soluble in THF.

The above procedure was repeated with and without catalyst. Sulfamic acid, and phenylsulfamic acid were used as catalysts. 1,2,4-Trichlorobenzene and o-dichlorobenzene were the solvents. The conversion data are in Table I. The data indicate sulfamic acid and phenylsulfamic acid are active catalysts for solution polymerization of dichlorophosphazenes using 1,2,4-trichlorobenzene or o-dichlorobenzene as solvents.

TABLE I

Relative Solution Polymerization Activity of Dichlorophosphazene Catalysts

| | Conditions | | | | | Conversion % |
|---|---|---|---|---|---|---|
| | | | Catalyst | | | |
| Run | (PNCl$_2$) Moles/L | Solvent Used | Used | mMole/ Mole(PNCl$_2$) | Time Hours | |
| 019 | 10.7 | TCB | None | | 3.5 | 0 |
| 020 | 10.7 | TCB | SA | 2.3 | 4.67 | 75 |
| 023 | 8.7 | DCB | SA | 3.0 | 4 | 29 |
| 026 | 10.9 | TCB | SA | 2.5 | 3.17 | 87 |
| 027 | 10.9 | TCB | SA | 2.5 | 2.33 | 55 |
| 031 | 6.1 | DCB | SA | 12.0 | 3.33 | 51 |
| 034 | 6.1 | DCB | SA | 12.5 | 4.0 | 33 |
| 035 | 10.4 | TCB | SA | 2.5 | 2.83 | 68 |
| 039 | 10.7 | TCB | PSA | 2.5 | 2 | 43 |
| 040 | 10.7 | TCB | PSA | 2.5 | 3 | 62 |
| 042 | 10.7 | TCB | PSA | 2.7 | 3.5 | 37 |

Note:
TCB - 1,2,4-trichlorobenzene
DCB - o-Dichlorobenzene
SA - Sulfamic acid
PSA - Phenylsulfamic acid
% Conversion based on weight of cyclic oligomer recovered.

EXAMPLE VI

The mass thermal polymerization procedure of Example IV was repeated except that a mixture of non-purified cyclic oligomers (15 g, 0.13 mole) crystallized from heptane was used as the starting material. The relatively impure material gelled soon after melting. After 48 hours at 250°±2° C., the tube was removed and worked up as in Example IV. The polymer obtained swelled but did not dissolve in toluene. The cross-linked polymer amounted to 12.5 g (83% conversion).

EXAMPLE VII

In the procedure of Example V, a sulfamic acid catalyzed solution polymerization was carried out in refluxing 1,2,4-trichlorobenzene using trimer/tetramer mixtures having mole ratios of these two components of either 80/20 or 90/10.

The data in Table II indicate MWD increases with increasing activity but decreases with increasing trimer/tetramer ratio. In prior art (G. L. Hagnauer and B. R. LaLiberte, Jo. Poly. Sci., 14, 369 (1976)), polymerizations employing pure trimer have molecular weight distributions as broad or broader than runs -080, -094, and -131.

Activity is defined as:

$$\text{activity} = \frac{\% \text{ Conversion}}{\text{mole \% catalyst} \times \text{run time (min.)}}$$

TABLE II

Mole Ratios of Oligomer and Molecular Weight Distribution

| Run | (PNCl$_2$) Moles/L | Cat$^{(1)}$ mMole/ Mole(PNCl$_2$) | Time Min. | % Conv. | Activity | MWD |
|---|---|---|---|---|---|---|
| | | (Mole Ratio n = 3/n = 4 : 80/20) | | | | |
| 080 | 8.62 | 11.4 | 210 | 40.3 | 0.17 | 12.6 |
| 0.94 | 6.25 | 2.4$^{(2)}$ | 410 | 14.0 | 0.14 | 12.8 |
| 131 | 6.25 | 7.2 | 140 | 49.0 | 0.49 | 18.4 |
| | | (Mole Ratio n = 3/n = 4 : 90/10) | | | | |
| 148 | 6.25 | 13.1 | 205 | 72.0 | 0.27 | 5.58 |
| 152 | 6.25 | 13.4 | 180 | 41.6 | 0.17 | 5.00 |
| 153 | 7.16 | 13.5 | 215 | 58.8 | 0.20 | 5.17 |

Note:
$^{(1)}$Catalyst is sulfamic acid.
$^{(2)}$Catalyst is N-phenylsulfamic acid.

EXAMPLE VIII

Dichlorophosphazene cyclic oligomers obtained from a commercial source (phosphonitrilic chloride monomer, Inabata & Co. Ltd., Osaka, Japan) were polymerized and analyzed for molecular weight distribution according to the following procedure:

Dichlorophosphazene cyclic oligomer (23.2 g, 0.20 moles) and the appropriate catalyst were suspended in 1,2,4-trichlorobenzene, 30 ml for 6.67 M or 50 ml for 4.00 M solutions of ($PNCl_2$). The reaction mixtures were purged with dry nitrogen and heated to reflux under $N_2$ with stirring. Reflux times in hours for each polymerization are given. The reaction mixtures were cooled and added slowly to n-heptane to precipitate the polymer. The n-heptane solution which contained excess cyclic oligomer was decanted, and the polymer dissolved in 300–500 ml tetrahydrofuran (THF). An aliquot of this solution was withdrawn and submitted for analysis of phosphorus and chlorine by X-ray fluorescence to determine percent conversion. The assay indicated that this technique is a reliable method of obtaining conversion data for active catalysts. Isolated yields of poly(organophosphazenes) by conventional techniques are within 5% of these values. The resulting data appear in Table III.

TABLE III

Catalyzed Polymerization of Dichlorophosphazene Cyclic Oligomer

| Run | ($PNCl_2$) Moles/L | Catalyst | mMole/Mole($PNCl_2$) | Time Hours | Conversion Based on P - % |
|---|---|---|---|---|---|
| 169-3 | 6.67 | A | 11 | 2 | 9.5 |
| 169-4 | 6.67 | B | 13 | 2 | 0.24 |
| 170-5 | 6.67 | C | 13 | 2⅔ | 6.62 |
| 170-7 | 4.00 | D | 10 | 2¾ | 56.2 |
| 170-8 | 4.00 | E | 13 | 4 | 40.5 |
| 171-10 | 4.00 | F | 13 | 3 | 0.15 |
| 172-11 | 4.00 | H | 13 | 2½ | 0.77 |
| 172-12 | 4.00 | I | 13 | 2½ | 0.57 |
| 172-13 | 4.00 | J | 13 | 3 | 0.68 |
| 172-14 | 4.00 | K | 10 | 2 1/6 | 32.3 |
| -004 | 4.00 | L | 10 | 5 | nil |

Note:
A - Ammonium Sulfamate
B - $HgCl_2$
C - $P_2O_5$
D - Sulfamic Acid
E - Chlorosulfonic Acid
F - Sodium Sulfamate
H - Glycine
I - Phenylsulfamic Acid
J - p-sulfanilic acid L - Potassium (dibenzo-18-crown-6) Sulfamate
(Catalysts B, C and E are taught in U.S. Pat. No. 4,005,171.)

Potassium sulfamate was reacted with dibenzo-18-crown-6 to form a soluble complex (Catalyst L) and to determine if the catalytic activity of sulfamic acid was due to the anionic moiety of the sulfamic acid. The crown ether salt was inactive, indicating both portions of the zwitterion are required for catalytic activity using sulfamic acid.

The molecular weight distribution (MWD) samples were prepared as follows: The above THF solution of the polymer was added dropwise to a molar excess of potassium phenoxide slurried in 50 ml THF. The reaction mixture was heated to reflux which temperature was maintained for 16–18 hours. The reaction mixture was cooled to room temperature and added slowly to a copious amount of water (3×excess or greater) with agitation. The precipitated polymer was collected by filtration, dried in vacuo at about 70° C., weighed and analyzed for molecular weight distribution by gel permeation chromatography. The resulting data are in Table IV.

TABLE IV

Poly(dichlorophosphazene) Molecular Weight Distribution

| Run | Catalyst | $\overline{M}_n$ | $\overline{M}_w$ | $\overline{M}_w/\overline{M}_n$ |
|---|---|---|---|---|
| 169-3 | $NH_4SO_3NH_2$ | 61,200 | 826,000 | 13.5 |
| 169-4 | $HgCl_2$ | — | — | —* |
| 170-5 | $P_2O_5$ | — | — | —* |
| 170-7 | $NH_2SO_3H$ | 33,000 | 404,000 | 12.2 |
| 170-8 | $ClSO_3H$ | 11,200 | 52,000 | 4.7 |
| 171-10 | $NaSO_3H$ | — | — | —* |
| 172-11 | Glycine | — | — | —* |
| 172-12 | I | — | — | —* |
| 172-13 | J | — | — | —* |
| 172-14 | $NH_4SO_3NH_2$ | 131,000 | 1,206,000 | 9.2 |

Note:
$\overline{M}_n$ - Number average molecular weight
$\overline{M}_w$ - Weight average molecular weight
I - Phenyl sulfamic acid
J - p-Sulfanilic acid
* - Not determined because of low conversion

EXAMPLE VIII

Dichlorophosphazene cyclic oligomers according to the procedure of Example VII were prepared using mixtures of sulfamic acid and ammonium sulfamate as catalyst to determine effect of these catalysts on molecular weight and molecular weight distribution. Total catalyst level was 10 mmole per mole of ($PNCl_2$) in each case. ($PNCl_2$) concentration was 4.0 moles in 1,2,4-trichlorobenzene. Molecular weight distribution was determined by gel permeation chromatography. The resulting data are in Table V.

TABLE V

Polymerization of Dichlorophosphazene Cyclic Oligmers With Mixed Sulfamic Acid/Ammonium Sulfamate Catalyst

| Run | Mole Ratio* | Run Time Hours | $\overline{M}_n$ | $\overline{M}_w$ | $\overline{M}_w/\overline{M}_n$ | Bimodal |
|---|---|---|---|---|---|---|
| 153 | 0/100 | 3.58 | 36 | 186 | 5.17 | No |
| 189 | 25/75 | 2.5 | 44 | 590 | 13.4 | Yes |
| 184 | 50/50 | 2.5 | 45 | 573 | 11.5 | Yes |
| 186 | 75/25 | 2.75 | 45.2 | 516 | 11.4 | Yes |
| 172-14 | 100/0 | 2.18 | 65 | 603 | 9.2 | Yes |

Molecular Weight-1000's

*$NH_2SO_2NH_4$ : $NH_2SO_3H$

The data indicate that use of ammonium sulfamate as a catalyst results in higher molecular weight polymer than does sulfamic acid. Both number average molecular weight ($\overline{M}_n$) and weight average molecular weight ($\overline{M}_w$) increase with increasing ammonium sulfamate in the catalyst mixture but bimodality also results.

What is claimed:

1. A process for polymerization of chlorophosphazenes to produce a $(Cl_2PN)_m$ polymer product having a controlled molecular weight and molecular weight range with controlled polydispersity in which m is 20 to 50,000 which process comprises polymerizing dichlorophosphazenes of the formula $(Cl_2PN)_n$ in which n is 3 to 7 and wherein the $(Cl_2PN)$ moiety is present in a concentration of at least one mole per liter in the presence of between about 0.1 mmole to about 50 mmoles of a sulfamic acid compound per mole of $(Cl_2PN)$ moiety, said sulfamic acid compound being selected from the group consisting of sulfamic acid, sulfamic acid salts and nitrogen-substituted derivatives of sulfamic acid which are N-alkyl, N-dialkyl, N-alkyl and N-aryl, N-aryl and N-diaryl, wherein the alkyl moiety is 1 to 12 carbon atoms and the aryl moiety is selected from the group consisting of phenyl, naphthyl, anthracenyl, phenanthrenyl, benzothienyl and fluorenyl moieties.

2. The process of claim 1 wherein n comprises the whole numbers 3 and 4.

3. The process of claim 2 wherein the sulfamic acid compound is sulfamic acid.

4. The process of claim 2 wherein the said polydispersity is less than 6.

5. The process of claim 1 wherein the said sulfamic acid compound is selected from the group consisting of sulfamic acid, ammonium sulfamate and N-phenyl sulfamic acid.

6. The process of claim 1 wherein the said sulfamic acid compound is present within the range of from about 2 to about 2.0 mmoles per mole of $(Cl_2PN)$ moiety.

7. The process of claim 1 wherein the said polydispersity is less than 10.

8. The process of claim 1 wherein the said polydispersity is greater than 10.

9. The process of claim 1 wherein the trimer to tetramer ratio is approximately 90:10.

10. The process of claim 1 wherein n consists essentially of the whole numbers 3 and 4 and the trimer to tetramer ratio is about 80:20.

11. The process of claim 1 wherein the said temperature is within the range from about 100° C. to about 350° C.

12. The process of claim 1 wherein the said temperature is within the range from about 125° C. to about 275° C.

* * * * *

UNITED STATES PATENT OFFICE
CERTIFICATE OF CORRECTION

Patent No. 4,242,316            Dated December 30, 1980

Inventor(s) David P. Sinclair

It is certified that error appears in the above-identified patent and that said Letters Patent are hereby corrected as shown below:

| Patent Column | Line | |
|---|---|---|
| 2 | 43 | "poly(dichlorophophazene)" should be --poly(dichlorophosphazene-- |
| 2 | 64 | "monomadality" should be --monomodality-- |
| 9 | 7 | "4,00" should be --4.00-- |

Signed and Sealed this

Twenty-fourth Day of March 1981

[SEAL]

Attest:

RENE D. TEGTMEYER

Attesting Officer      Acting Commissioner of Patents and Trademarks